Figure 1:
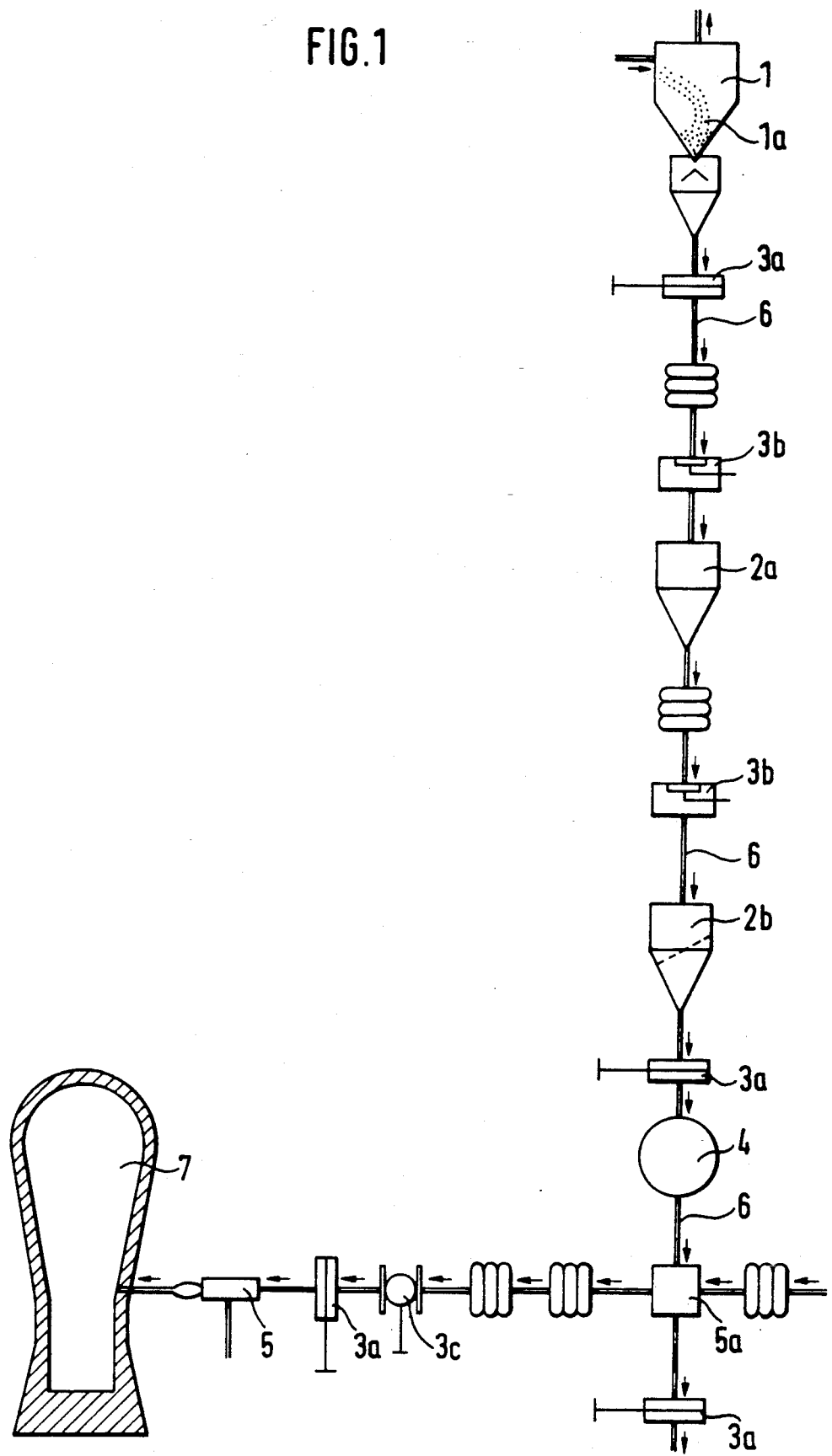

United States Patent [19]
Mayr et al.

[11] Patent Number: 5,259,594
[45] Date of Patent: Nov. 9, 1993

[54] HOT DUST RECYCLING APPARATUS

[75] Inventors: Herbert Mayr, Asten, Austria; Rolf Hauk, Achern; Rodgan Vuletic, Düsseldorf, both of Fed. Rep. of Germany; Werner Kepplinger, Leonding, Austria

[73] Assignee: Deutsche Voest-Alpine, Dusseldorf, Fed. Rep. of Germany

[21] Appl. No.: 815,348

[22] Filed: Dec. 27, 1991

[30] Foreign Application Priority Data

Dec. 27, 1990 [DE] Fed. Rep. of Germany ....... 4041936

[51] Int. Cl.⁵ ............................................... C21B 5/06
[52] U.S. Cl. ...................................... 266/157; 75/464; 75/549; 266/156
[58] Field of Search ................... 266/156, 157; 75/549, 75/464

[56] References Cited

U.S. PATENT DOCUMENTS 3,951,644 4/1976 Block ..................................... 75/464

Primary Examiner—Peter D. Rosenberg

[57] ABSTRACT

A process for recycling hot dust from a gasifier or meltdown gasifier by means of a hot gas cyclone separator integrated into a pipe system is described, together with the associated apparatus. The hot dust from the hot gas cyclone separator is supplied by means of a lock system to a burner in order to overcome the pressure difference between the hot gas cyclone separator and the meltdown gasifier. By means of the lock system the dust is supplied from a lower pressure zone to a higher pressure zone. The dust to be recycled comprises coke or a mixture of coke and iron particles.

15 Claims, 2 Drawing Sheets

HOT DUST RECYCLING APPARATUS

The invention relates to a hot dust recycling process and apparatus. Hot dust is recycled during the manufacture of molten pig iron or steel products from iron-containing material or during the gasification of coal.

Austrian patent 381 116 describes a process which, using lower-grade coal, provides for an additional heat supply by burning coal particles separated from the reduction gas.

In an apparatus for performing this process on the melt-down gasifier are provided in ring-like manner burners in at least two superimposed, horizontal planes.

In connection with the present process, this problem is inventively solved by the features of claim 1 and for the present apparatus by the features of claim 3, in conjunction with the subclaims in each case.

The crude reduction gas obtained in the melt-down gasifier is introduced into a hot gas cyclone separator and the solids are removed. The dust mainly comprising coke and iron particles is removed.

From the hot gas cyclone separator the hot dust is conveyed by means of a lock system to the burner. The lock system for overcoming the pressure difference between the hot gas cyclone separator and the melt-down gasifier comprioco dust bunkers, hot dust slide valves and a bucket wheel lock in the form of a dosing member to the injector and to the burner.

Blade slide valves are installed as cutoff members for repair and maintenance purposes. The hot dust is supplied via the lock system from a lower pressure zone in the hot gas cyclone separator to a higher pressure zone on the burners located on the melt-down gasifier. The lock system prevents a return flow or a suction of gas and dust and makes it possible to shut off the dust supply. As a result of the high temperatures and the pressure difference between the hot gas cyclone separator and the burners on the melt-down gasifier, the hot dust slide valves are, according to the invention, provided with a water cooling system and by coating the sealing faces with hard or sintered metal are constructed in such a way that they on the one hand provide a reliable seal and on the other withstand the abrasive action of the dust conveyed. The hot gas cyclone separator is appropriately constructed as a welded structure from sheet metal and having a lining.

The dust bunkers are sheet metal lined pressure vessels. For determining the dust fill level, radioactive test probes are installed in the dust bunkers.

The hot dust slide valves are water-cooled by means of a milled labyrinth construction for the low-loss cooling water distribution over the casing and also by direct cooling of the valve shaft.

The hot dust slide valve disk is moved by means of pneumatic cylinders. The valve shaft is mounted with a ball seat and a packing box. The slide valve disk and the slideways for the latter are coated with hard or sintered metal.

The bucket wheel lock has a complete water cooling of the casing, rotor and bucket wheel. The rotor of the bucket wheel lock is constructed conically and has a weld hard face of high-temperature cobalt-hard alloy. The rotor can also be adjusted for ensuring the necessary seal.

The burners are located directly on the melt-down gasifier and gasify the hot dust by means of oxygen. The burners are completely water-cooled. The remaining pipe lengths are provided with heat-resistant inner tubes with a ceramic cord envelope.

Under normal hot dust recycling conditions the blade slide valves and ball cock are open and are only closed for maintenance or repair purposes.

The invention is described in greater detail hereinafter relative to an embodiment and the attached drawings, wherein show:

FIG. 1 A diagram of the inventive dust recycling with lock system.

Figure 2:
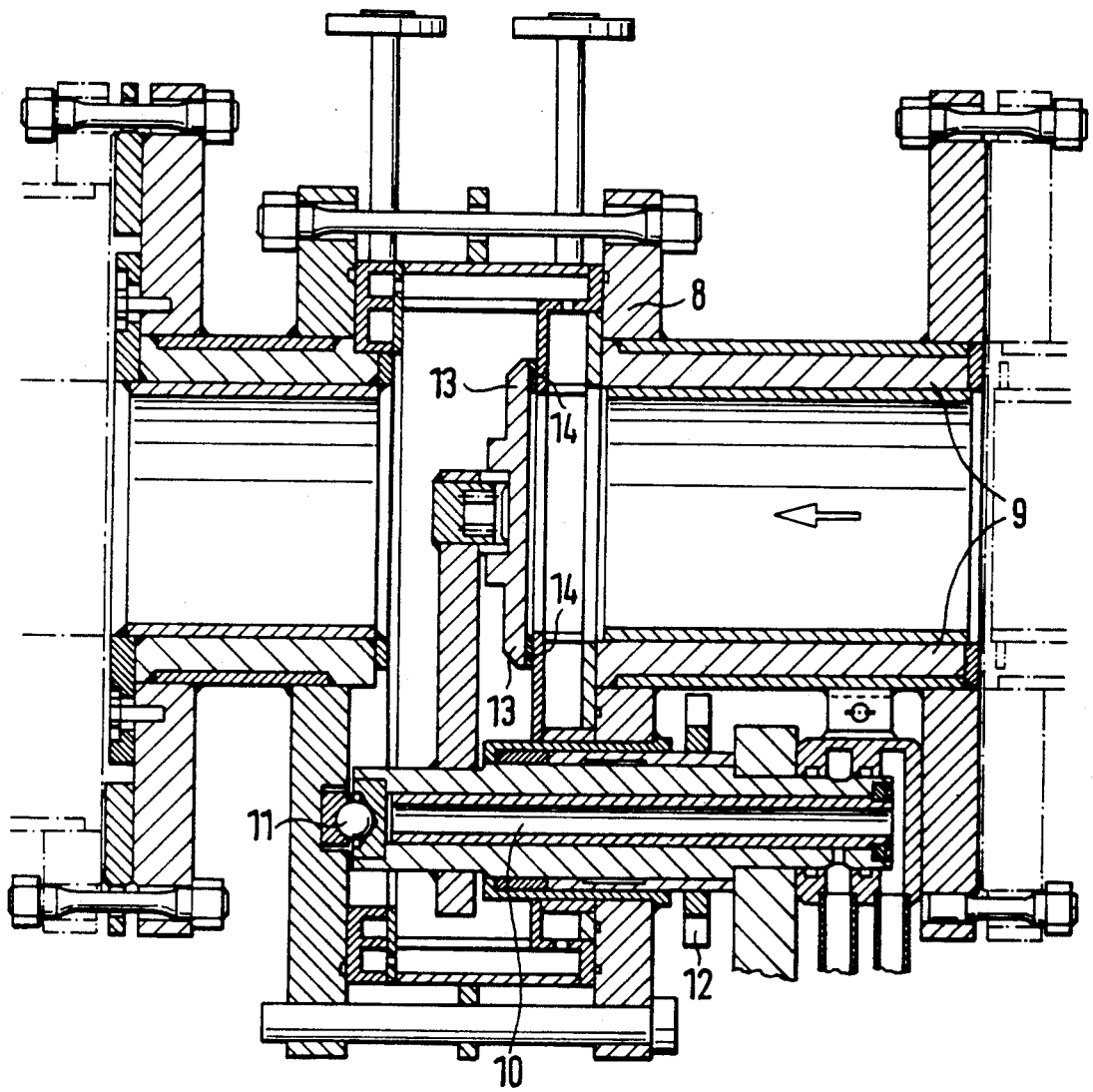

FIG. 2 A sectional representation through an inventive hot dust slide valve.

As shown in FIG. 1, the dust 1a at roughly 850° C. and which mainly comprises coke and iron particles, is separated in the hot gas cyclone 1, which is a welded, lined, sheet steel structure.

The separated dust 1a is conveyed by means of a lock system 2a, 2b, 3a, 3b, 3c, 4 to the burner 5. The lock system for overcoming the pressure difference of approximately 5 KPa between the hot gas cyclone separator 1 and the burners 5 on the melt-down gasifier 7 comprises dust bunkers 2a, 2b, hot dust slide valves 3b, blade slide valves 3a, at least one bucket wheel lock 4 and a ball cock 3c.

The lock system 2a, 2b, 3a, 3b, 3c, 4 conveys the hot dust from a lower pressure zone in the hot gas cyclone separator 1 to a higher pressure zone on the burners 5 positioned on the melt-down gasifier 7.

The hot gas cyclone separator 1 is followed by a first blade slide valve 3a and a first hot dust slide valve 3b. Further blade slide valves 3a are located above and below the bucket wheel lock 4 and immediately upstream of the burner 5.

The blade valve 3a and ball cock 3c are normally open and are only closed for maintenance or repair purposes. The hot dust slide valves 3b are installed above and below the dust bunker 2a. In conjunction with the dust bunkers 2a, 2b and the bucket wheel lock 4 they act as a lock system, which conveys the hot dust from a lower pressure zone to a higher pressure zone. The hot dust slide valve construction will be explained relative to FIG. 2.

By means of the blade valve 3a and the hot dust valve 3b the hot dust passes into a first dust bunker 2a, then into a second dust bunker 2b and from there into the bucket wheel lock 4.

The dust bunkers 2a, 2b are constructed as lined, sheet metal pressure vessels. For determining and monitoring the fill level the dust bunkers 2a, 2b contain radioactive test probes. The hot dust valves 3b arranged above and below the dust bunkers 2a, 2b operate automatically.

The bucket wheel lock 4 is installed between the injector 5a and the lower dust bunker 2b and acts as a dosing member to the injector 5a and burners 5. It conveys the hot dust regulated by the injector 5a, which conveys the dust by means of fuel gas to the burners.

The bucket wheel lock 4 fulfils the function of the dosed feeding in of the injector conveying system and also has a bottom to top sealing function in the lock system. The bucket wheel lock 4 has a complete water cooling of the casing, the rotor and the bucket wheel with shaft. The rotor is conically constructed and provided with a weld hard face made from a high-temperature cobalt-hard alloy. The rotor is adjustable in order to permanently ensure the necessary sealing. The burners 5 are fitted directly to the melt-down gasifier 7 and gasify the hot dust by means of oxygen. The burners 5 are completely water-cooled.

For thermal insulation reasons and for avoiding stresses due to alternating temperature loading the connecting pipe lengths 6 of the above-described dust recycling components such as the hot gas cyclone separator 1, the dust bunkers 2a, 2b, blade valves 3a, hot dust valves 3b, bucket wheel lock 4, injector 5a and burners 5 are provided with heat-resistant inner tubes with a ceramic cord envelope.

FIG. 2 is a sectional representation through a hot dust slide valve according to the invention. The hot dust slide valve 3b is a gastight shutoff member, which is moved up and down by means of pneumatic cylinders. The hot dust valve 3b has a valve casing 8, which is provided with a milled labyrinth construction 9 for water cooling and low-loss cooling water distribution purposes. The valve shaft 10 is also water-cooled. The valve shaft 10 is mounted by means of a ball seat 11 and a packing box 12. The valve disk 13 is moved by means of pneumatic cylinders. The valve disk 13 and slideways 14 for the latter are coated with hard or sintered metal to prevent wear and to ensure gastightness. The infeed and outflow connections of the hot dust slide valve are provided with inner tubes of heat-resistant steel and ceramic cord envelopes.

We claim:

1. An apparatus for recycling hot dust from a gasifier, comprising a hot gas cyclone separator for separating the dust from the gas as received from the gasifier, a burner located downstream of the cyclone for gasifying the dust, and a lock system located between the cyclone and the burner for overcoming the pressure difference therebetween, the lock system comprising, in succession, downstream of the cyclone, a first automatic hot dust slide valve, a first dust bunker pressure vessel, a second automatic hot dust slide valve, a second dust bunker pressure vessel, and a bucket wheel lock for dosed feeding of the dust to the burner.

2. The apparatus of claim 1, further comprising a ball cock valve located between the bucket wheel and the burner, a first blade slide valve located between the cyclone and the first hot dust valve, a second blade slide valve located between the second dust bunker and the bucket wheel, and a third blade slide valve located between the ball cock valve and the burner, wherein said ball cock valve and said blade slide valves are open during operation of the apparatus.

3. Apparatus according to claim 1, wherein the hot gas cyclone separator is constructed as a lined, sheet metal welded structure.

4. Apparatus according to claim 1, wherein the first dust bunker and the second dust bunker are constructed as lined, sheet metal structures.

5. Apparatus according to claim 4, wherein the dust bunkers contain radioactive test probes for determining the filling level of the dust.

6. Apparatus according to claim 1, wherein the hot dust slide valves have a valve casing with a milled labyrinth construction for low-loss cooling water distribution.

7. Apparatus according to any one of claims 1 and 6, wherein the hot dust slide valves have a water-cooled valve shaft and a valve disk moved by means of pneumatic cylinders.

8. Apparatus according to claim 1, wherein the hot dust slide valves have a valve shaft, which cooperates with a ball seat and a packing box.

9. Apparatus according to claim 1, wherein the hot dust slide valve has a valve disk and slideways therefor, the valve disk and the slideways being coated with hard or sintered metal.

10. Apparatus according to any one of claims 1 and 6, wherein the hot dust slide valves comprise infeed and outlet connections and said connections are provided with inner tubes of heat-resistant steel with a ceramic cord envelope.

11. Apparatus according to claim 1, wherein the bucket wheel lock comprises a casing, rotor and shaft, and wherein said casing, rotor and shaft are water cooled.

12. Apparatus according to claim 11, wherein the rotor is conically constructed and is provided with a weld hard face of high-temperature cobalt-hard alloy.

13. Apparatus according to any one of claims 11 and 12, wherein the rotor is adjustable in order to maintain the sealing effect.

14. Apparatus according to claim 1, wherein the burner is water cooled.

15. Apparatus according to any one of claims 1 and 2, wherein the parts of the apparatus are connected via pipe lengths, the pipe lengths being provided with heat-resistant inner tubes and a ceramic cord envelope.

* * * * *

UNITED STATES PATENT AND TRADEMARK OFFICE
CERTIFICATE OF CORRECTION

PATENT NO.  : 5,259,594
DATED       : Nov. 9, 1993
INVENTOR(S) : Herbert Mayr, et al It is certified that error appears in the above-indentified patent and that said Letters Patent is hereby corrected as shown below:

On the title page, item [75] should read as follows:

[75] Inventors: Herbert Mayr, Asten, Austria; Rolf Hauk, Achern; Bodgan Vuletic, Dusseldorf, both of Fed. Rep. of Germany; Werner Kepplinger, Leonding, Austria Signed and Sealed this Sixth Day of September, 1994

*Attest:*

BRUCE LEHMAN

*Attesting Officer*        *Commissioner of Patents and Trademarks*